US011697410B2

(12) United States Patent
Wang et al.

(10) Patent No.: US 11,697,410 B2
(45) Date of Patent: Jul. 11, 2023

(54) VEHICLE-TO-EVERYTHING COMMUNICATION-BASED LANE CHANGE COLLISION AVOIDANCE WARNING

(71) Applicant: TOYOTA JIDOSHA KABUSHIKI KAISHA, Toyota (JP)

(72) Inventors: Ziran Wang, Mountain View, CA (US); Kyungtae Han, Mountain View, CA (US); BaekGyu Kim, Mountain View, CA (US)

(*) Notice: Subject to any disclaimer, the term of this patent is extended or adjusted under 35 U.S.C. 154(b) by 295 days.

(21) Appl. No.: 16/295,700

(22) Filed: Mar. 7, 2019

(65) Prior Publication Data

US 2020/0282981 A1 Sep. 10, 2020

(51) Int. Cl.
*B60W 30/09* (2012.01)
*B60W 30/095* (2012.01)
(Continued)

(52) U.S. Cl.
CPC .......... *B60W 30/09* (2013.01); *B60Q 9/008* (2013.01); *B60W 30/0956* (2013.01);
(Continued)

(58) Field of Classification Search
CPC .......... B60W 30/09; B60W 30/0956; B60W 30/18163; B60W 2554/00;
(Continued)

(56) References Cited

U.S. PATENT DOCUMENTS 9,802,614 B1 * 10/2017 Yoon ............... G08G 1/161
10,098,014 B1 10/2018 Shimizu et al.
(Continued)

FOREIGN PATENT DOCUMENTS

CN 107993489 A * 5/2018
CN 108482250 A * 9/2018
(Continued)

OTHER PUBLICATIONS

Federal Register / vol. 82, No. 8 / Thursday, Jan. 12, 2017 / Proposed Rules Federal Motor Vehicle Safety Standards; V2V Communications (Year: 2017).*
(Continued)

*Primary Examiner* — Behrang Badii
*Assistant Examiner* — Jay Khandpur
(74) *Attorney, Agent, or Firm* — Burbage Law, P.C.; Jon-Michael Burbage

(57) ABSTRACT

The disclosure describes embodiments for modifying a whether an ego vehicle changes lanes to a target lane at a target time based on a payload of a Vehicle-to-Everything (V2X) message originated by a remote vehicle. In some embodiments, a method includes determining, based on the payload, whether the remote vehicle is changing lanes to the target lane at the target time. The method includes determining that the ego vehicle is changing lanes to the target lane at approximately the target time. The method includes estimating that the ego vehicle and the remote vehicle will collide at the target lane at the target time. The method includes modifying an operation of a vehicle component of the ego vehicle so that the ego vehicle does not change lanes to the target lane at the target time.

20 Claims, 10 Drawing Sheets

(51) Int. Cl.
  *B60W 30/18* (2012.01)
  *B60Q 9/00* (2006.01)
  *H04W 4/40* (2018.01)
  *G05D 1/02* (2020.01)
  *B60Q 5/00* (2006.01)
  *B60T 8/1755* (2006.01)
  *G08G 1/16* (2006.01)
  *B60W 30/08* (2012.01)
  *B60Q 1/50* (2006.01)

(52) U.S. Cl.
  CPC ........ *B60W 30/18163* (2013.01); *H04W 4/40* (2018.02); *B60Q 1/525* (2013.01); *B60Q 5/006* (2013.01); *B60Q 9/005* (2013.01); *B60Q 9/006* (2013.01); *B60Q 9/007* (2013.01); *B60T 8/17558* (2013.01); *B60W 30/08* (2013.01); *B60W 2554/00* (2020.02); *B60W 2556/45* (2020.02); *B60W 2556/60* (2020.02); *G05D 1/0214* (2013.01); *G05D 2201/0213* (2013.01); *G08G 1/16* (2013.01)

(58) Field of Classification Search
  CPC ......... B60W 2556/45; B60W 2556/60; B60W 30/08; B60Q 9/008; B60Q 9/007; B60Q 9/005; B60Q 9/006; B60Q 1/525; B60Q 5/006; G05D 1/0214; G05D 2201/0213; H04W 4/40; B60T 8/17558; G08G 1/16

See application file for complete search history.

(56) References Cited

U.S. PATENT DOCUMENTS

| | | | |
|---|---|---|---|
| 2015/0123778 A1* | 5/2015 | Konet | G08G 1/166 340/435 |
| 2017/0210282 A1* | 7/2017 | Rodriguez Barros | B60Q 1/2669 |
| 2018/0173230 A1* | 6/2018 | Goldman-Shenhar | B60W 50/14 |
| 2019/0071013 A1* | 3/2019 | Adam | B60W 40/04 |
| 2020/0008086 A1* | 1/2020 | Lu | H04W 72/082 |
| 2020/0019176 A1* | 1/2020 | Meifang | G01S 13/878 |
| 2020/0247412 A1* | 8/2020 | Wang | H04W 4/46 |
| 2020/0409387 A1* | 12/2020 | Tsurumi | G05D 1/0238 |

FOREIGN PATENT DOCUMENTS

| | | | | |
|---|---|---|---|---|
| CN | 110808804 A | * | 2/2020 | |
| CN | 110809904 A | * | 2/2020 | ............ H04W 28/22 |
| WO | WO-2015120953 A1 | * | 8/2015 | ...... B60W 30/18163 |

OTHER PUBLICATIONS

EPO, Communication Pursuant to Article 94(3) EPC for European Patent Application No. 20151624.2, dated Sep. 3, 2021, 4 pages.

* cited by examiner

BSM DATA 195

- Vehicles and other client devices equipped with Dedicated Short Range Communication ("DSRC") transmit a Basic Safety Message ("BSM") at a regular interval.

- Each BSM includes the following BSM data describing one or more of the following types of digital data for the remote vehicle that originally sent the BSM:
    (1) GPS Data Describing the Location of the Vehicle, where the GPS Data may be so accurate that it describes the specific parking space the Vehicle is parked in;
    (2) Heading Data Describing a past Direction of travel for the Vehicle, if any;
    (3) Velocity Data Describing a past Velocity of the Vehicle;
    (4) Path History of Vehicle (e.g., path history data); and
    (5) Remote Data 194 describing the remote vehicle that transmits this BSM.

Figure 4

BSM DATA 195

Part 1

GPS Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2

Vehicle Path History
Future Vehicle Path Estimation
Hard Active Braking
Traction Control System active over 100 milliseconds?
Antilock Brake System active over 100 milliseconds?
Light Status
Wiper Status
Vehicle type
A unique identifier of the vehicle (e.g., a VIN number)
Remote Data 194 describing:
    (1) whether the turn signal of the remote vehicle is engaged;
    (2) the turning direction of the turn signal if it is engaged;
    (3) changes in the remote vehicle's lateral position over time;
    (4) changes in the remote vehicle's heading direction over time; and
    (5) changes in the remote vehicle's steering wheel angle over time.

Figure 5

VEHICLE-TO-EVERYTHING COMMUNICATION-BASED LANE CHANGE COLLISION AVOIDANCE WARNING

BACKGROUND

The specification relates to Vehicle-to-Everything (V2X) communication-based lane change collision avoidance warnings. In particular, this specification relates to modifying a vehicle component based on ranging and misbehavior information determined from digital data included in a V2X communication.

Drivers of ego vehicles frequently change lanes to target lanes in situations where they cannot view other remote vehicles that want to change lanes to the same target lane. For example, an ego vehicle and a remote vehicle each want to change lanes to a target lane ("lane X") and the ego vehicle and the remote vehicle are occluded from one another. As a result, these vehicles are likely to collide with one another. FIG. 6 an example of this problem.

Collisions are likely in these situations because (1) the drivers of the ego vehicle and the remote vehicle cannot see that other vehicles are trying to changes lanes to the same target lane, and so, they cannot respond with driving decisions that avoid a collision; and (2) the Advanced Driver Assistance Systems (ADAS systems) of these vehicles will not be able detect the potential collision because neither vehicle's onboard sensors will be able to measure the presence/movement of the other vehicle that is trying to change lanes to the same target lane, and so, the ADAS systems will not be able to respond with an output that decreases the likelihood of a collision. As a result, a collision is more likely to occur in these situations.

SUMMARY

Described herein are embodiments of a warning system. The warning system beneficially solves the problem of providing a warning to a driver of an ego vehicle about a potential collision involving an occluded remote vehicle that is attempting to change lanes into the same target lane as the ego vehicle.

There is an existing solution that attempts to solve this problem. This existing solution consists of an ego vehicle using its onboard sensors (e.g., LIDAR, radar, cameras, etc.) to detect the presence of a remote vehicle that is within a predetermined distance of the ego vehicle and then provide a collision warning to the driver of the ego vehicle. However, this existing solution is inadequate in situations where the remote vehicle is occluded so that the onboard sensors of the ego vehicle are unable to detect the presence of the remote vehicle.

By comparison, the embodiments of the warning system described herein use V2X communications to detect a presence of an occluded vehicle that is changing lanes to a same target lane as the ego vehicle and at approximately the same time as the ego vehicle such that a collision may occur. If such a potential collision is detected, the warning system provides warnings to the driver of the ego vehicle so that the driver can decide not to attempt changing lanes to the target vehicle at this time. The V2X communications include remote data that describe sensor measurements recorded by the onboard sensors of the remote vehicle. In this way, the warning system enables the ego vehicle to determine that a collision is likely using the sensor measurements that are recorded by the remote vehicle and not the onboard sensors of the ego vehicle.

There is no existing solution that includes a warning system installed in an electronic control unit (ECU) of an ego vehicle that provides a warning to a driver of the ego vehicle about a potential collision involving an occluded remote vehicle that is attempting to change lanes into the same target lane as the ego vehicle at approximately the same time as the ego vehicle. There are also no existing solutions that uses V2X communications to solve this problem.

An example advantage or improvement provided by the warning system which is not provided by the existing solutions are the unique ways of determining a driver's lane change intent and the unique warnings provided to a driver to warn of a possible collision if they change lanes. The inventors are aware of no warning system that provides similar functionality.

An additional advantage provided by the warning system includes the ability of an ego vehicle to use V2X communications to execute the following operations: proactively identify a potential collision involving an occluded remote vehicle that is attempting to change lanes into the same target lane as the ego vehicle at approximately the same time as the ego vehicle; and proactively provide a warning to the ego driver of the ego vehicle so that the ego driver does not attempt to change lanes to the same target lane as the remote vehicle or at the same time as the remote vehicle.

There is no existing solution that includes a warning system installed in an ECU of an ego vehicle that provides a warning to a driver of the ego vehicle about a potential collision involving an occluded remote vehicle that is attempting to change lanes into the same target lane as the ego vehicle at approximately the same time as the ego vehicle.

Embodiments of the warning system are now described. In some embodiments, the warning system includes software installed in an ECU of an ego vehicle. The ego vehicle is traveling in a roadway environment with a remote vehicle. The remote vehicle may also include an ECU that stores its own instance of the warning system. The ego vehicle and the remote vehicle are both connected vehicles that include a V2X radio. The ego vehicle's sensors are not able to measure information about the remote vehicles because they are occluded.

A driver of the remote vehicle is referred to as a "remote driver" and a driver of the ego vehicle is referred to as an "ego driver."

Embodiments of "remote data" are now described. The V2X radio of the remote vehicle transmits a V2X message including remote data. The remote data is digital data that describes information that indicates a lane change intent of the remote vehicle. For example, the remote data is digital data that describes one or more of the following: (1) whether the turn signal of the remote vehicle is engaged; (2) the turning direction for the turn signal if it is engaged; (3) changes in the remote vehicle's lateral position over time; (4) changes in the remote vehicle's heading position over time; and (5) changes in the remote vehicle's steering wheel angle over time. These sensor measurements indicate a lane change intent of the remote vehicle.

Example alternative embodiments are now described. In some embodiments, the remote vehicle may include a warning system that uses the onboard sensors of the remote vehicle to gather the remote data which is transmitted to the ego vehicle. In some embodiments, the remote vehicle does not include a warning system. In this second embodiment, the remote data may be included in part 2 of a Basic Safety Message ("BSM" if singular, "BSMs" if plural) that is transmitted by the V2X radio of the remote vehicle at some regular interval (e.g., once every 0.10 seconds). See FIG. 5 for an example payload for a BSM.

Regardless of the embodiment, the warning system of the ego vehicle receives the V2X message and parses out the remote data from the V2X message. The warning system of the ego vehicle stores the remote data in a memory of the ego vehicle.

Embodiments of "ego data" are now described. The warning system of the ego vehicle cause the onboard sensors of the ego vehicle to record ego data describing the lane change intent of the ego vehicle. The ego data is digital data that describes one or more of the following: (1) whether the turn signal of the ego vehicle is engaged; (2) the turning direction for the turn signal if it is engaged; (3) changes in the ego vehicle's lateral position over time; (4) changes in the ego vehicle's heading position over time; and (5) changes in the ego vehicle's steering wheel angle over time.

In some embodiments, the warning system of the ego vehicle stores the ego data in the memory of the ego vehicle In some embodiments, the warning system of the ego vehicle includes code and routines that are operable, when executed by the ECU of the ego vehicle, to cause the ECU to analyze the remote data and the ego data and execute one or more of the following example steps: (1) determine whether the ego vehicle is estimated to change lanes to a particular lane [i.e., "lane X"] in the future; (2) determine whether the remote vehicle is estimated to change lanes to lane X in the future; (3) determine ego time information describing a time when the ego vehicle is likely to arrive at lane X; (4) determine remote time information describing a time when the remote vehicle is likely to arrive at lane X; (5) determine whether the ego vehicle is likely to collide with the remote vehicle when it arrives at lane X because both the ego vehicle and the remote vehicle are changing lanes to lane X at approximately the same time; and (6) if a collision is determined to be likely to occur at step 5, then proactively provide a warning to the ego driver of the ego vehicle before the ego driver attempts to change lanes to lane X so that the ego driver can decide not to change lanes to lane X and thereby avoid the collision with the remote vehicle.

Examples of warnings provided by the warning system include one or more of the following: providing a small counter-steering force on the steering wheel; vibrating the steering wheel; generating a warning message that is displayed on a screen or heads-up display unit (HUD) of the ego vehicle; and generating a warning sound/message that is played over the speakers of the ego vehicle.

An example advantage or improvement provided by the embodiments of the warning system that is not provided by the existing solutions includes the operation of the warning system to determine the future actions of the remote vehicle based on remote data that is recorded by the remote vehicle itself and transmitted to the ego vehicle using V2X communication; the ego vehicle does not rely on its own sensor measurements when determining the future actions of the remote vehicle.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method executed by an ego vehicle, the method including: determining, based on a payload for a V2X message originated by a remote vehicle, whether the remote vehicle is changing lanes to a target lane at a target time; determining that the ego vehicle is changing lanes to the target lane at approximately the target time; estimating that the ego vehicle and the remote vehicle will collide at the target lane at the target time; and modifying an operation of a vehicle component of the ego vehicle so that the ego vehicle does not change lanes to the target lane at the target time. Other embodiments of this aspect include corresponding computer systems, apparatus, and computer programs recorded on one or more computer storage devices, each configured to perform the actions of the methods.

Implementations may include one or more of the following features. The method where the V2X message is a dedicated short-range communication message. The method where the V2X message is not one of the following: a WiFi message; a 3G message; a 4G message; a 5G message; a long-term evolution (LTE) message; a millimeter wave communication message; a Bluetooth message; and a satellite communication. The method where the V2X message is received by a V2X radio. The method where the V2X radio is not an element of the ego vehicle. The method where the V2X radio includes a plurality of channels including a reserved channel that is reserved for receiving the V2X message. The method where the reserved channel is reserved for a BSM. The method where the vehicle component is selected from a group that includes: an advanced driver assistance system; an autonomous driving system; a communication unit; a speaker; a display; a heads-up display unit; and an actuator. Implementations of the described techniques may include hardware, a method or process, or computer software on a computer-accessible medium.

One general aspect includes a system included in an ego vehicle, the system including: a processor communicatively coupled to a V2X radio and a non-transitory memory, where the V2X radio is operable to receive a V2X message and the non-transitory memory stores computer code that is operable, when executed by the processor, to cause the processor to: determine, based on a payload for a V2X message originated by a remote vehicle, whether the remote vehicle is changing lanes to a target lane at a target time; determine that the ego vehicle is changing lanes to the target lane at approximately the target time; estimate that the ego vehicle and the remote vehicle will collide at the target lane at the target time; and modify an operation of a vehicle component of the ego vehicle so that the ego vehicle does not change lanes to the target lane at the target time. Other embodiments of this aspect include corresponding computer systems, apparatus, and computer programs recorded on one or more computer storage devices, each configured to perform the actions of the methods.

Implementations may include one or more of the following features. The system where the V2X message is a dedicated short-range communication message. The system where the V2X message is not one of the following: a WiFi message; a 3G message; a 4G message; a 5G message; an LTE message; a millimeter wave communication message; a Bluetooth message; and a satellite communication. The system where the V2X message is received by a V2X radio. The system where the V2X radio is not an element of the ego vehicle. The system where the V2X radio includes a plurality of channels including a reserved channel that is reserved for receiving the V2X message. The system where the reserved channel is reserved for a BSM. The system where the vehicle component is selected from a group that includes: an advanced driver assistance system; an autonomous driving system; a communication unit; a speaker; a display; a heads-up display unit; and an actuator. Implementations of the described techniques may include hardware, a method or process, or computer software on a computer-accessible medium.

One general aspect includes a computer program product including instructions that, when executed by a processor, causes the processor to perform operations including: determining, based on a payload for a V2X message originated by a remote vehicle, whether the remote vehicle is changing lanes to a target lane at a target time; determining that an ego vehicle is changing lanes to the target lane at approximately the target time; estimating that the ego vehicle and the remote vehicle will collide at the target lane at the target time; and modifying an operation of a vehicle component of the ego vehicle so that the ego vehicle does not change lanes to the target lane at the target time. Other embodiments of this aspect include corresponding computer systems, apparatus, and computer programs recorded on one or more computer storage devices, each configured to perform the actions of the methods.

Implementations may include one or more of the following features. The computer program product where modifying the operation of the vehicle component includes one of the following: modifying the vehicle component so that the vehicle component does not steer the ego vehicle to the target lane; modifying the operation of the vehicle component includes modifying the vehicle component so that the vehicle component only steers the ego vehicle to the target lane at a modified time that is different than the target time. The computer program product where modifying the operation of the vehicle component includes causing the vehicle component to provide a warning to a driver of the ego vehicle. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 4 and 5 are block diagrams illustrating an example of BSM data according to some embodiments.

DETAILED DESCRIPTION

Figure 1A:
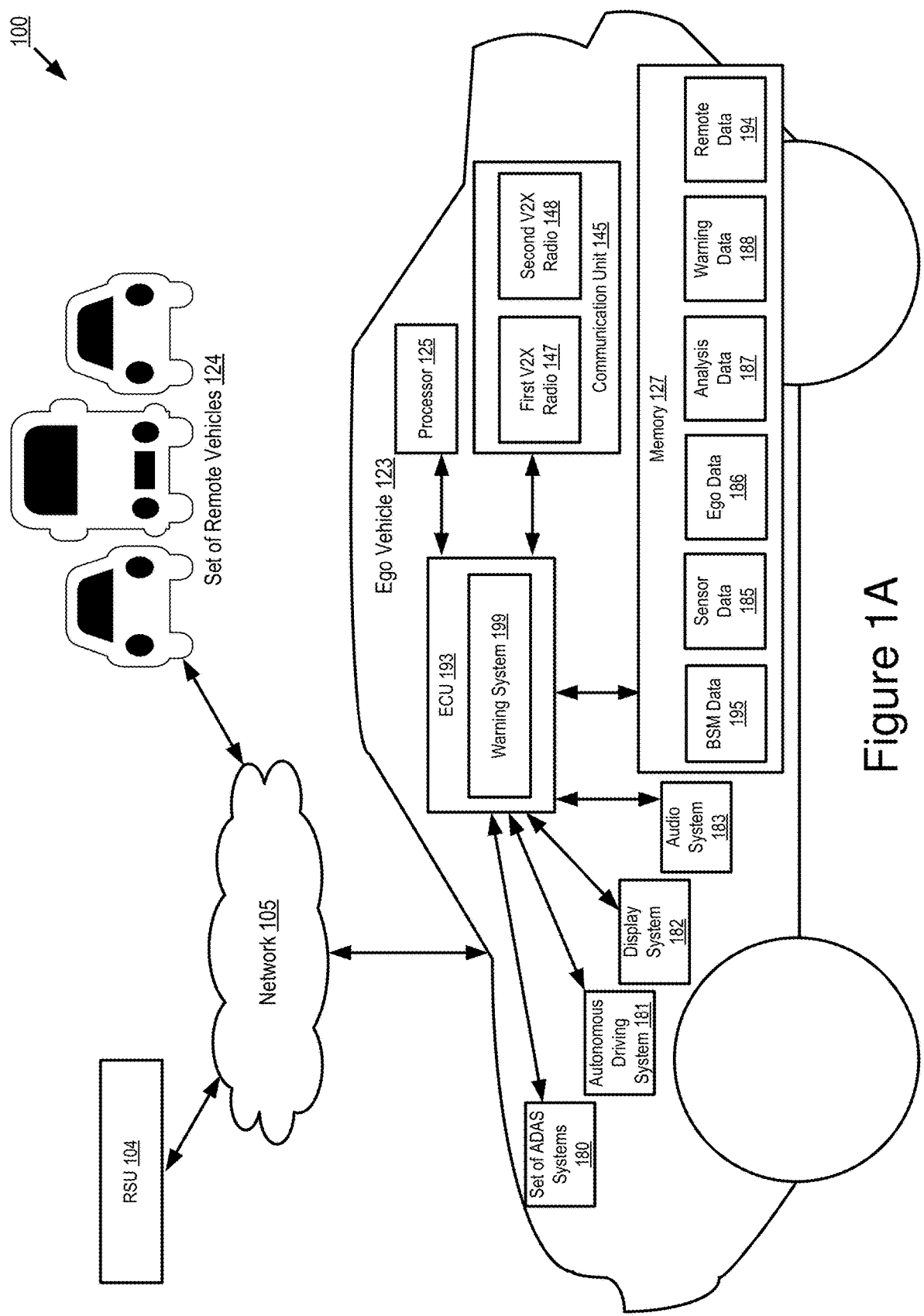
FIG. 1A is a block diagram illustrating an operating environment for a warning system according to some embodiments.

Embodiments of the warning system are now described. Although the warning system is described herein at times with reference to BSMs, the warning system will also work with any other type of V2X message and radio technologies (e.g., LTE-V2X, 5G-V2X, etc.).

The warning system is operable, when executed by a processor of a connected vehicle, to cause the processor to modify an operation of a vehicle component of the connected vehicle based on a payload of a V2X communication. Examples of V2X communication include one or more of the following: DSRC (including BSMs and PSMs, among other types of DSRC communication); LTE; millimeter wave communication; 3G; 4G; 5G; LTE-Vehicle-to-Everything (LTE-V2X); LTE-Vehicle-to-Vehicle (LTE-V2V); LTE-Device-to-Device (LTE-D2D); Voice over LTE (VoLTE); etc. In some embodiments, the V2X communication does not include one or more of the following: DSRC; 3G, 4G; 5G; LTE-V2X; LTE-V2V; LTE-D2D; and VoLTE.

In some embodiments, the connected vehicle that includes the warning system is a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages. A DSRC-compliant GPS unit is operable to provide positional information for a vehicle (or some other DSRC-equipped device that includes the DSRC-compliant GPS unit) that has lane-level accuracy. The DSRC-compliant GPS unit is described in more detail below A "DSRC-equipped" device is a processor-based device that includes a DSRC radio, a DSRC-compliant GPS unit and is operable to lawfully send and receive DSRC messages in a jurisdiction where the DSRC-equipped device is located. Various endpoints may be DSRC-equipped devices, including, for example, a roadside unit (RSU), a smartphone, a tablet computer and any other processor-based computing device that includes a DSRC radio and is operable to lawfully send and receive DSRC messages as described above.

In some embodiments, an RSU that is a DSRC-equipped device does not include a DSRC-compliant GPS unit, but does include a non-transitory memory that stores digital data describing positional information for the RSU having lane-level accuracy, and the DSRC radio or some other system of the RSU inserts a copy of this digital data in the BSM data that is transmitted by the DSRC radio of the RSU. In this way, the RSU does not include a DSRC-compliant GPS unit but is still operable to distribute BSM data that satisfies the requirements for the DSRC standard. The BSM data is described in more detail below with reference to FIGS. 4 and 5 according to some embodiments.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In the United States, Europe, and Asia, DSRC messages are transmitted at 5.9 GHz. In the United States, DSRC messages are allocated 75 MHz of spectrum in the 5.9 GHz band. In Europe and Asia, DSRC messages are allocated 30 MHz of spectrum in the 5.9 GHz band. A wireless message, therefore, is not a DSRC message unless it operates in the 5.9 GHz band. A wireless message is also not a DSRC message unless it is transmitted by a DSRC transmitter of a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

The wireless messages of key fobs made as a component of a remote keyless entry system are not DSRC messages for additional reasons. For example, the payload for a DSRC message is also required to include digital data describing a rich amount of vehicular data of various types of data. In general, a DSRC message always includes, at a minimum, a unique identifier of the vehicle which transmits the DSRC message as well as the GPS data for that vehicle. This amount of data requires a larger bandwidth than what is possible for other types of non-DSRC wireless messages. For example, FIGS. 4 and 5 depict examples of a permissible payload for a particular type of DSRC message referred to as a BSM. The wireless messages of key fobs as a component of a remote keyless entry system are not DSRC messages because they do not include a payload which is permissible under the DSRC standard. For example, a key fob merely transmits a wireless message including a digital key which is known to a vehicle which is paired with the key fob; there is not sufficient bandwidth for other data to be included in the payload because the bandwidth allocated for these transmissions is very small. By comparison, DSRC messages are allocated large amounts of bandwidth and are required to include a far richer amount of data, including, for example, a unique identifier and the GPS data for the vehicle which transmitted the DSRC message.

In some embodiments, a DSRC-equipped vehicle does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway.

In some embodiments, a DSRC-compliant GPS unit is operable to identify, monitor and track its two-dimensional position within 1.5 meters of its actual position 68% of the time under an open sky.

In the United States, vehicles are equipped or will soon be equipped with V2X communication capability. These vehicles are referred to as V2X-equipped vehicles. V2X-equipped vehicles include: (1) onboard sensors that are operable to record data describing the path history and kinematic information about the vehicle (e.g., heading, speed, braking patterns such as hard braking, etc.); and (2) at least one V2X radio that is operable to transmit V2X messages, including BSMs which are transmitted at a user-configurable interval (the default interval is once every 0.10 seconds) and include BSM data that describes, among other things, historical and future actions of the vehicle that originally transmits the V2X message and the historical and future states of the vehicle that originally transmits the V2X message. A vehicle that originally transmits a V2X message, as opposed to one that merely receives or relays such a V2X message, is referred to as an originator of the V2X message. For example, a vehicle that originally broadcasts a BSM is the originator of that BSM and the payload for that BSM will describe this originating vehicle.

Figure 3:
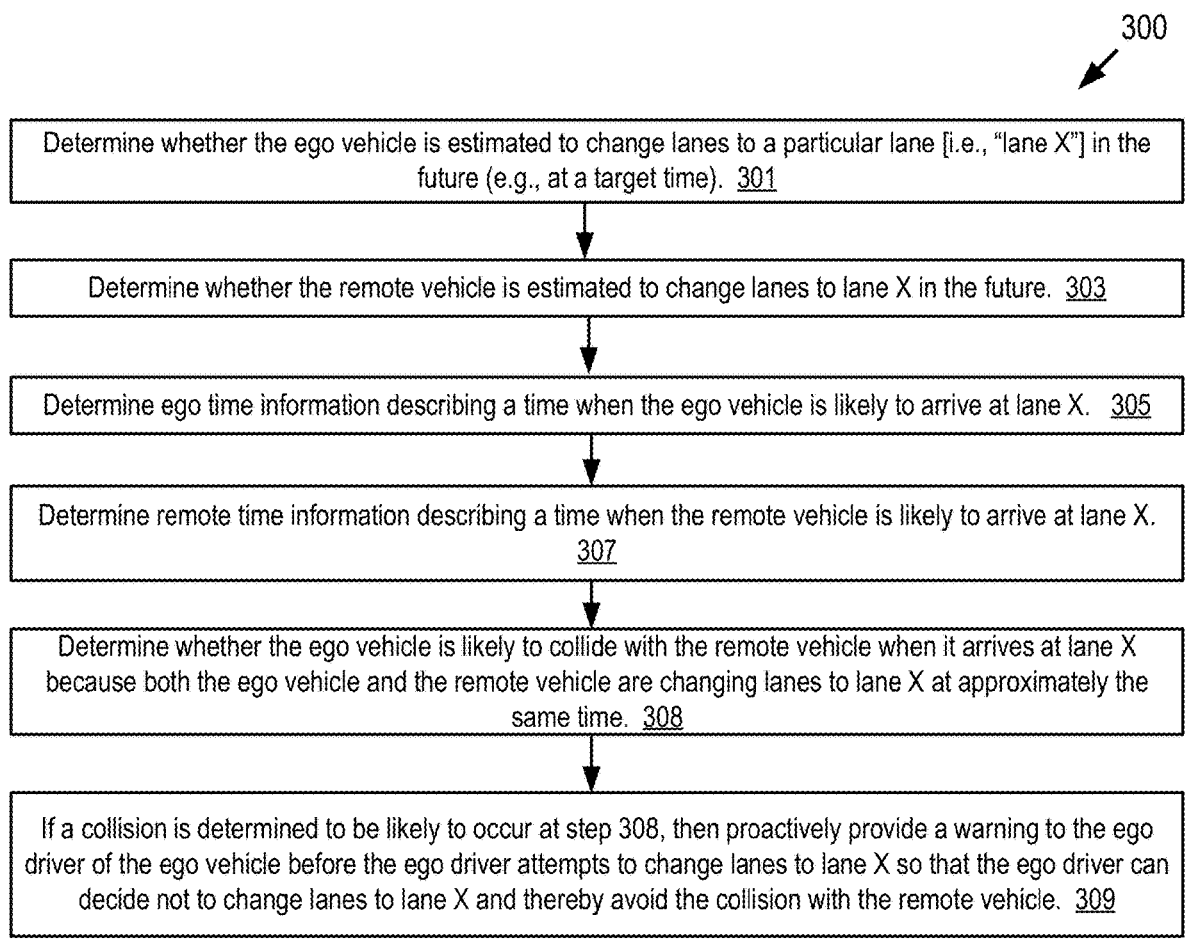
FIG. 3 depicts a method for to modifying a vehicle component of an ego vehicle based on a payload of a V2X communication so that the ego vehicle does not collide with a remote vehicle according to some embodiments.
Figure 8A:
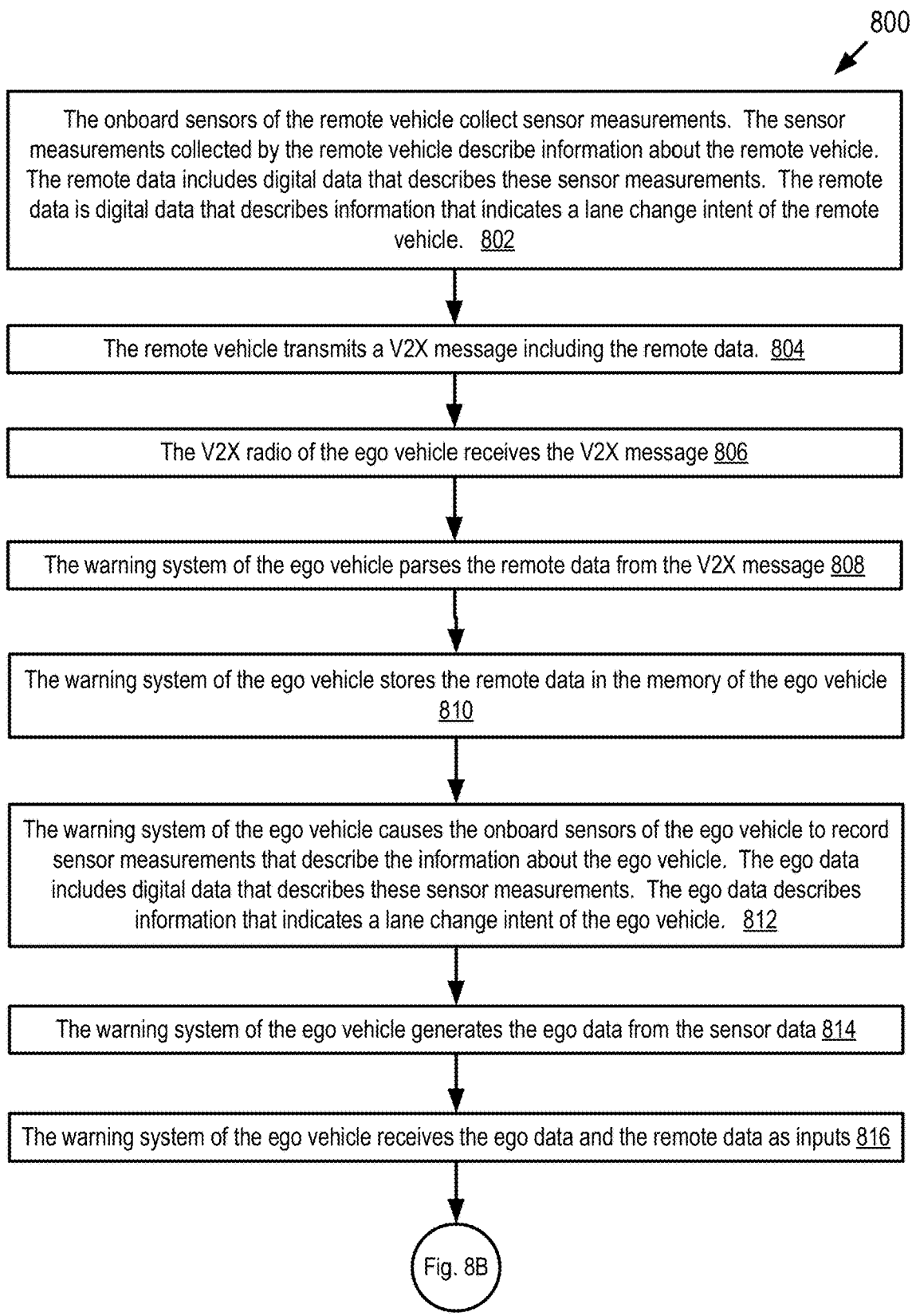
FIGS. 8A and 8B depicts a method for to modifying a vehicle component of an ego vehicle based on a payload of a V2X communication so that the ego vehicle does not collide with a remote vehicle according to some embodiments.
Figure 8B:
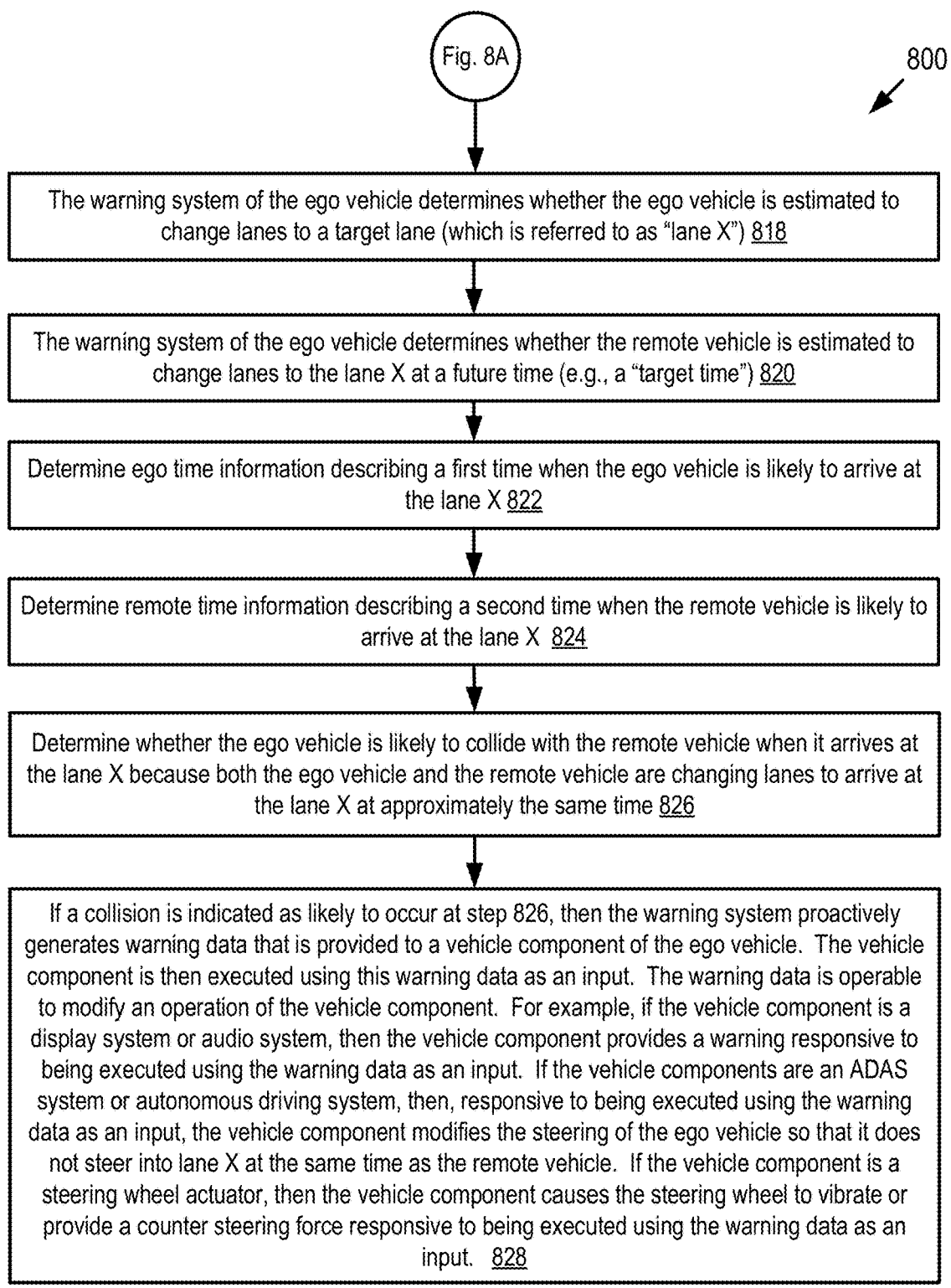

The warning system described herein is operable, when executed by a processor of a connected vehicle, to cause the processor to execute one or more steps of the methods 300, 800 depicted in FIGS. 3 and 8A through 8B, respectively.

In some embodiments, the warning system includes code and routines that are installed on an Electronic Control Unit (ECU) of an ego vehicle. The ego vehicle is a connected vehicle. In some embodiments, the ego vehicle is an autonomous or semi-autonomous vehicle. The ego vehicle includes a V2X radio that is operable to receive V2X messages such as DSRC communications.

The functionality of the warning system is not limited to DSRC technology. For example, the method described in the preceding paragraph refers to BSMs, but the warning system is operable to provide its functionality using other types of V2X messages and the digital data payload that is included in these V2X messages.

Referring to FIG. 1A, depicted is an operating environment 100 for a warning system 199 according to some embodiments. As depicted, the operating environment 100 includes the following elements: an ego vehicle 123; a set of remote vehicles 124; and an RSU 104. These elements are communicatively coupled to one another by a network 105.

Although one ego vehicle 123, one RSU 104, and one network 105 are depicted in FIG. 1A, in practice the operating environment 100 may include one or more vehicles 123, one or more RSUs 104, and one or more networks 105.

The set of remote vehicles 124 includes one or more connected vehicles. The connected vehicles included in the set of remote vehicles 124 include similar functionality as the ego vehicle 123. The connected vehicles included in the set of remote vehicles 124 are referred to herein as: (1) a "remote vehicle" or "remote vehicle 124" (if singular); or (2) the "remote vehicles" or "remote vehicles 124" (if plural).

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2X, LTE-D2D, VoLTE, LTE-5G or any other mobile data network or combination of mobile data networks. Further, the network 105 may include one or more IEEE 802.11 wireless networks.

The following are endpoints of the network 105: the vehicles 123; the RSU 104;

and the set of remote vehicles 124.

The RSU 104 is a roadside unit. In some embodiments, the RSU 104 is operable to relay or re-broadcasts any V2X messages it receives. For example, the RSU 104 receives a BSM and re-broadcasts the BSM to other endpoints, thereby extending the range of the BSM so that it may be received by more endpoints.

The ego vehicle 123 is any type of connected vehicle. For example, the ego vehicle 123 is one of the following types of vehicles: a car; a truck; a sports utility vehicle; a bus; a semi-truck; a robotic car; a drone or any other roadway-based conveyance. In some embodiments, the ego vehicle 123 is a DSRC-equipped vehicle.

In some embodiments, the ego vehicle 123 is an autonomous vehicle or a semi-autonomous vehicle. For example, the ego vehicle 123 includes a set of Advanced Driver Assistance Systems 180 (a set of "ADAS systems" 180) which provide autonomous features to the ego vehicle 123 which are sufficient to render the ego vehicle 123 an autonomous vehicle.

The National Highway Traffic Safety Administration ("NHTSA") has defined different "levels" of autonomous vehicles, e.g., Level 0, Level 1, Level 2, Level 3, Level 4, and Level 5. If an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower level number. The different levels of autonomous vehicles are described briefly below.

Level 0: The set of ADAS systems 180 installed in a vehicle have no vehicle control. The set of ADAS systems 180 may issue warnings to the driver of the vehicle. A vehicle which is Level 0 is not an autonomous or semi-autonomous vehicle.

Level 1: The driver must be ready to take driving control of the autonomous vehicle at any time. The set of ADAS systems 180 installed in the autonomous vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems 180 installed in the autonomous vehicle fail to respond properly (based on the driver's subjective judgement). The set of ADAS systems 180 installed in the autonomous vehicle executes accelerating, braking, and steering. The set of ADAS systems 180 installed in the autonomous vehicle can deactivate immediately upon takeover by the driver.

Level 3: Within known, limited environments (such as freeways), the driver can safely turn their attention away from driving tasks but must still be prepared to take control of the autonomous vehicle when needed.

Level 4: The set of ADAS systems 180 installed in the autonomous vehicle can control the autonomous vehicle in all but a few environments such as severe weather. The driver must enable the automated system (which is comprised of the set of ADAS systems 180 installed in the vehicle) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

A highly autonomous vehicle (HAV) is an autonomous vehicle that is Level 3 or higher.

Accordingly, in some embodiments the ego vehicle 123 is one of the following: a Level 1 autonomous vehicle; a Level 2 autonomous vehicle; a Level 3 autonomous vehicle; a Level 4 autonomous vehicle; a Level 5 autonomous vehicle; and an HAV.

Examples of the ADAS systems included in the set of ADAS systems 180 may include one or more of the following elements of the vehicle 123: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

The autonomous driving system 181 is any computer system whose operation renders the ego vehicle 123 an autonomous vehicle. For example, the autonomous driving system 181 includes an onboard unit having a set of ADAS systems 180 installed therein and the onboard unit executes the set of ADAS systems 180 to ender the ego vehicle 123 an autonomous vehicle. The autonomous driving system 181 is an optional element of the ego vehicle 123. The ego vehicle 123 does not have to be autonomous for the warning system 199 to provide its functionality.

In some embodiments, the ego vehicle 123 includes the following elements: the set of ADAS systems 180; the autonomous driving system 181; a display system 182; an audio system 183; a processor 125; a memory 127; a communication unit 145; an electronic control unit 193 (ECU 193); and a warning system 199. In some embodiments, the ego vehicle 123 includes an actuator. The actuator may be installed in a steering wheel of the ego vehicle. The actuator may be operable to cause the steering wheel to vibrate or turn.

In some embodiments, the processor 125 and the memory 127 may be elements of an onboard vehicle computer system (such as computer system 200 described below with reference to FIG. 2). The onboard vehicle computer system may be operable to cause or control the operation of the warning system 199 of the ego vehicle 123. The onboard vehicle computer system may be operable to access and execute the data stored on the memory 127 to provide the functionality described herein for the warning system 199 of the ego vehicle 123 or its elements (see, e.g., FIG. 2). The onboard vehicle computer system may be operable to execute the warning system 199 which causes the onboard vehicle computer system to execute one or more steps of one or more of the method 300 described below with reference to FIG. 3 and/or the method 800 described below with reference to FIGS. 8A and 8B.

In some embodiments, the processor 125 and the memory 127 may be elements of an onboard unit. The onboard unit includes the ECU 193 or some other onboard vehicle computer system that may be operable to cause or control the operation of the warning system 199. The onboard unit may be operable to access and execute the data stored on the memory 127 to provide the functionality described herein for the warning system 199 or its elements. The onboard unit may be operable to execute the warning system 199 which causes the onboard unit to execute one or more steps of one or more of the method 300 described below with reference to FIG. 3 and/or the method 800 described below with reference to FIGS. 8A and 8B. In some embodiments, the computer system 200 depicted in FIG. 2 is an example of an onboard unit. For example, the computer system 200 is an example of an ECU 193.

In some embodiments, the ego vehicle 123 may include a sensor set. The sensor set may include one or more sensors that are operable to measure one or more of the physical environment outside of the ego vehicle 123, the state of the ego vehicle 123, and the historical behavior of the ego vehicle 123. For example, the sensor set may include one or more sensors that record one or more physical characteristics of the physical environment that is proximate to the ego vehicle 123. The memory 127 may store sensor data that describes the one or more physical characteristics recorded by the sensor set.

In some embodiments, the sensors included in the sensor set include range finding and position locating sensors such as LIDAR, radar, and GPS, as well as any other sensors that may be used to determine changes in a vehicle's lateral position, heading, steering wheel angle, etc.

In some embodiments, the sensor set of the ego vehicle 123 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 123 may include one or more processors 125. Other processors, operating systems, sensors, displays, and physical configurations may be possible.

The memory 127 is a non-transitory memory that stores instructions or data that may be accessed and executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random-access memory (virtual RAM). The ego vehicle 123 may include one or more memories 127.

In some embodiments, the memory 127 stores, as digital data, any data described herein. In some embodiments, the memory 127 stores any data that is necessary for the warning system 199 to provide its functionality.

For example, the memory 127 stores the following types of digital data: BSM data 195; sensor data 185; ego data 186; analysis data 187; warning data 188; and remote data 194.

The BSM data 195 includes the digital data that is the payload for a V2X message. Examples of the BSM data 195 are depicted in FIGS. 4 and 5.

The sensor data 185 includes digital data that describes the sensor measurements that are measured and recorded by the sensor set.

In some embodiments, the sensor data 185 is digital data that is included in the BSM data 195 that is received from a remote vehicle included in the set of remote vehicles 124. In these embodiments, the sensor data 185 includes digital data that describes sensor measurements that are measured and recorded by the sensor set of a remote vehicle included in the set of remote vehicles 124.

In some embodiments, the warning system 199 of the ego vehicle 123 causes the onboard sensors of the ego vehicle 123 to record ego data 186 describing the lane change intent of the ego vehicle 123. The ego data 186 is digital data that describes one or more of the following: (1) whether the turn signal of the ego vehicle 123 is engaged; (2) the turning direction for the turn signal if it is engaged; (3) changes in the lateral position of the ego vehicle 123 over time; (4) changes in the heading position of the ego vehicle 123 over time; and (5) changes in a steering wheel angle of the ego vehicle 123 over time.

The analysis data 187 is digital data that describes the results of the analysis described below with reference to steps 818-826 as depicted in FIG. 8B. For example, the analysis data 187 is digital data that describes one or more of the following: whether the ego vehicle 123 is estimated to change lanes to a target lane; a target time when the ego vehicle 123 is estimated to change lanes to the target lane; whether a remote vehicle 124 is estimated to change lanes to the target lane; whether the remote vehicle 124 is likely to arrive at the target lane at the target time or a time that is cotemporaneous to the target time; whether the ego vehicle 123 and the remote vehicle 124 are likely to collide because they both change lanes to the same target lane at the same target time (or approximately at the same target time).

The warning data 188 is digital data that is operable to modify an operation of a vehicle component of the ego vehicle 123 so that a collision between the ego vehicle 123 and a remote vehicle 124 does not occur.

In some embodiments, the warning data 188 is digital data that is operable, when inputted to the display system 182 or the audio system 183, to provide a warning to the driver of the ego vehicle 123 by: (1) causing the display system 182 to display a visual warning (e.g., a graphical user interface is displayed on an electronic display of the display system 182 and depicts a visual warning message); or (2) causing the audio system 183 to generate a auditory warning (e.g., a speaker of the audio system 183 vibrates to generate audio that provides a auditory warning message).

In some embodiments, a steering wheel of the ego vehicle 123 includes an actuator. The warning data 188 is digital data that is operable, when inputted to the actuator, to cause the actuator to provide a counter-steering force on the steering wheel of the ego vehicle 123 or cause this steering wheel to vibrate.

In some embodiments, the warning data 188 is operable to modify an operation of the ADAS system 180 or the autonomous driving system 181 so that these components of the ego vehicle 123: (1) do not steer the ego vehicle 123 into the target lane; or (2) do not steer the ego vehicle 123 into the target lane at the target time.

In some embodiments, a V2X radio of the remote vehicle 124 transmits a V2X message including remote data 194 within its payload. For example, the remote data 194 is an element of the BSM data 195 which is the payload for the V2X message. The remote data 194 is digital data that describes one or more of the following: (1) whether the turn signal of the remote vehicle 124 is engaged; (2) the turning direction for the turn signal if it is engaged; (3) changes in a lateral position of the remote vehicle 124 over time; changes in a heading position of the remote vehicle 124 over time; and (4) changes in a steering wheel angle of the remote vehicle 124 over time. In some embodiments, the remote data 194 is an element of the BSM data 195.

The communication unit 145 transmits and receives data to and from a network 105 or to another communication channel. In some embodiments, the communication unit 145 may include a DSRC transceiver, a DSRC receiver and other hardware or software necessary to make the ego vehicle 123 a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes: a first V2X radio 147; and a second V2X radio 148.

The first V2X radio 147 is an electronic device that includes a V2X transmitter and a V2X receiver that is operable to send and receive wireless messages via any V2X protocol. For example, the first V2X radio 147 is operable to send and receive wireless messages via DSRC. The V2X transmitter is operable to transmit and broadcast DSRC messages over the 5.9 GHz band. The V2X receiver is operable to receive DSRC messages over the 5.9 GHz band. The first V2X radio 147 includes seven channels (e.g., DSRC channel numbers 172, 174, 176, 178, 180, 182 and 184) with at least one of these channels reserved for sending and receiving BSMs (e.g., DSRC channel number 172 is reserved for BSMs). In some embodiments, at least one of these channels is reserved for sending and receiving Pedestrian Safety Messages (PSMs) as described in U.S. patent application Ser. No. 15/796,296 filed on Oct. 27, 2017 and entitled "PSM Message-based Device Discovery for a Vehicular Mesh Network," the entirety of which is hereby incorporated by reference. In some embodiments, DSRC channel number 172 is reserved for sending and receiving PSMs. In some embodiments, DSRC channel number 176 is reserved for sending and receiving PSMs.

In some embodiments, the first V2X radio 147 includes a non-transitory memory which stores digital data that controls the frequency for broadcasting BSMs. In some embodiments, the non-transitory memory stores a buffered version of the GPS data for the ego vehicle 123 so that the GPS data for the ego vehicle 123 is broadcast as an element of the BSMs which are regularly broadcast by the first V2X radio 147.

In some embodiments, the first V2X radio 147 includes any hardware or software which is necessary to make the ego vehicle 123 compliant with the DSRC standards. In some embodiments, the DSRC-compliant GPS unit 250 depicted in FIG. 2 is an element of the first V2X radio 147.

The second V2X radio 148 is an electronic device that includes a V2X transmitter and a V2X receiver that is operable to send and receive wireless messages via any V2X protocol. The second V2X radio 148 provides functionality that is similar to the first V2X radio 147, and so, that description will not be repeated here.

Figure 1B:
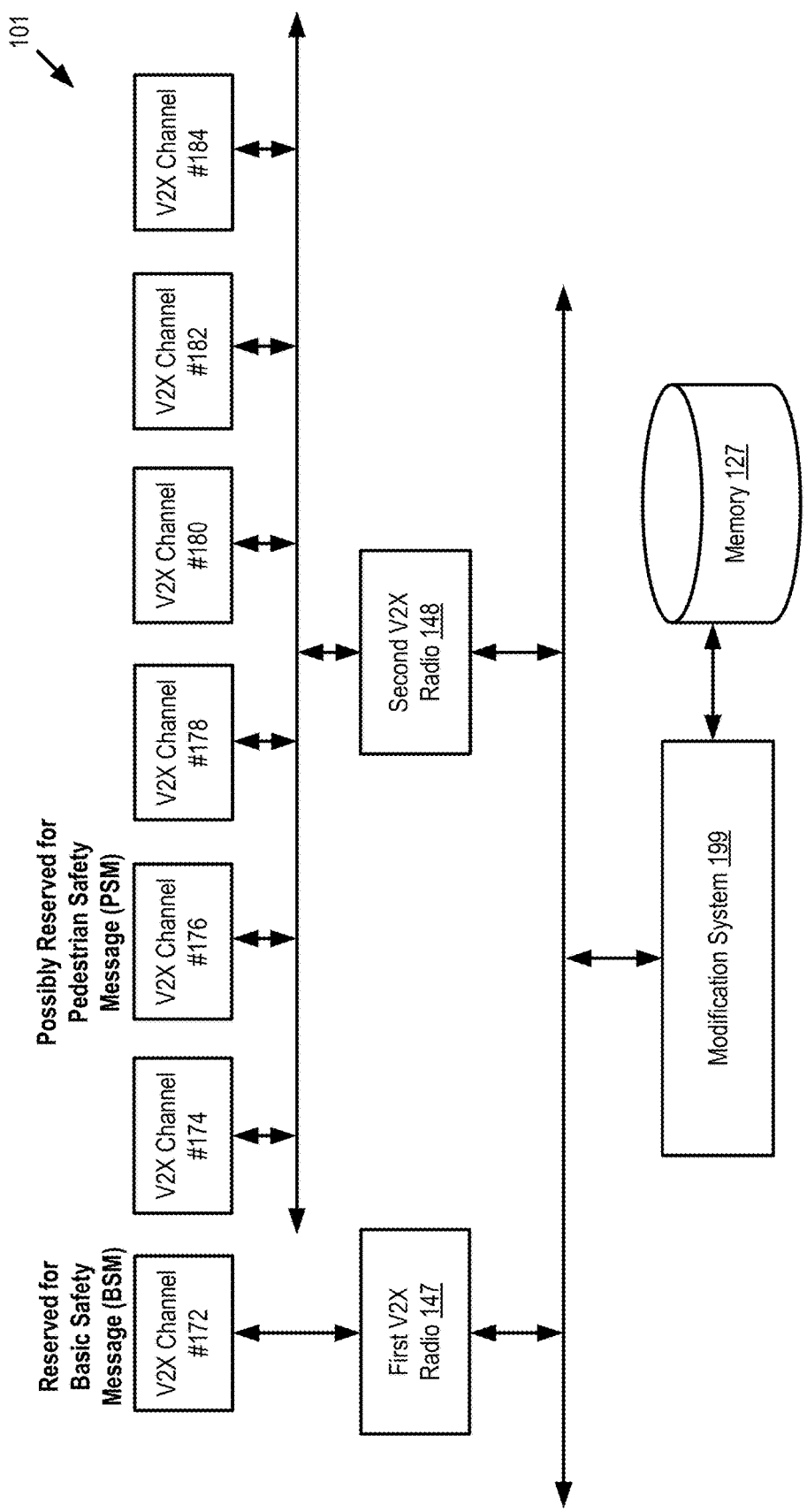
FIG. 1B is a block diagram illustrating a set of V2X radios and a warning system according to some embodiments.

In some embodiments, the first V2X radio 147 includes a single channel that is dedicated to sending and/or receiving a particular type of wireless message. For example, the first V2X radio 147 includes a single channel that is dedicated to sending and receiving BSMs. See, for example, FIG. 1B in which the first V2X radio 147 includes channel 172 which is dedicated to sending and receiving BSMs. In some embodiments, the first V2X radio 147 includes a single channel that is dedicated to sending and receiving BSMs and the second V2X radio 148 includes a plurality of other channels that are operable to send and receive any V2X messages that are not BSMs. For example, the second V2X radio 148 includes six other channels as depicted in FIG. 1B that are operable to send and receive any V2X messages that are not BSMs.

In another example, the first V2X radio 147 includes a single channel that is dedicated to receiving PSMs and the second V2X radio 148 includes a plurality of other channels that are operable to send and receive any V2X messages that are not PSMs.

In some embodiments, the first V2X radio 147 is a first DSRC radio dedicated to sending and receiving BSMs. The first V2X radio 147 includes a first DSRC radio transceiver. The second V2X radio 148 is a second DSRC radio that sends and receives any DSRC messages which are not BSMs. The second V2X radio 148 includes a second DSRC radio transceiver. Accordingly, in some embodiments the ego vehicle 123 is a DSRC-enabled vehicle that includes two different DSRC radios.

In some embodiments, the warning system 199 includes software that is operable, when executed by the processor 125, to cause the processor 125 to execute one or more steps of the method 300 described below with reference to FIG. 3 and/or the method 800 described below with reference to FIGS. 8A and 8B. The functionality of the warning system 199 is described in more detail below according to some embodiments.

In some embodiments, the warning system 199 is implemented using hardware including a field-programmable gate array ("FPGA") or an application-specific integrated circuit ("ASIC"). In some other embodiments, the warning system 199 implemented using a combination of hardware and software.

A remote vehicle 124 includes elements similar to the ego vehicle 123. For example, a remote vehicle includes one or more of the following elements: a processor 125; an ECU 193; a warning system 199; a communication unit 145; a set of ADAS systems 180; an autonomous driving system 181; and a memory 127 storing digital data similar to that which is stored by the memory 127 of the ego vehicle 123. In some embodiments, the remote vehicle is a manufactured by a same manufacturer as the ego vehicle 123 and these vehicles are configured or otherwise operable to cooperate with one another to provide the functionality of the warning system 199.

In some embodiments, the remote vehicle 124 does not include a warning system 199.

In some embodiments, the remote vehicle 124 is an electronic device that is operable to send and receive V2X communications. For example, the remote vehicle is an DSRC-equipped device that is operable to send and receive DSRC messages, BSMs, or some other type of V2X messages including the BSM data 195 as its payload.

In some embodiments, the RSU 104 is a DSRC-equipped roadside unit. In some embodiments, the RSU 104 includes a communication unit similar to the communication unit 145 included in the ego vehicle 123. In some embodiments, the RSU 104 is operable to receive and relay V2X communications.

In some embodiments, the RSU 104 is any electronic device that is operable to send and receive V2X communications. For example, RSU 104 is an electronic device, or another connected vehicle, including a communication unit similar to the communication unit 145. In some embodiments, the RSU 104 is a smartphone, tablet computer, personal computer, roadside unit, or some other processor-based computing device that includes a communication unit 145. In some embodiments, RSU 104 is a DSRC-equipped device that is operable to send and receive DSRC messages, BSMs, or some other type of V2X messages including the BSM data 195 as its payload.

DSRC is increasingly being included in vehicles because it is a source of sensor data 185 which is required for many ADAS systems (such as those included in the set of ADAS systems 180) or autonomous driving systems 181 to provide their functionality. In the United States, seven different channels are dedicated to DSRC, with one of these seven channels generally used for transmission of BSMs. For example, the channel generally used for transmission of BSMs is used about 99% of the time for BSM transmissions, and so, for the purposes of this description, this channel is referred to as "the channel dedicated to BSMs" or "the channel reserved for BSMs." The channel dedicated to BSMs (i.e., channel 172) receives a lot of use because each DSRC-enabled vehicle on the roadway transmits BSMs at regular intervals (e.g., one every 0.10 seconds). Another of these seven channels may be generally used for PSMs in a manner similar to how channel 172 is generally used for BSMs, and so, this channel is referred to as being "dedicated to PSMs" or "reserved for PSMs." For example, channel 176 may be generally used for PSMs.

In some embodiments, when the ego vehicle 123 is operating on a roadway these two channels (i.e., the first for BSMs and the second for PSMs) are in near constant use, almost always sending or receiving BSMs or PSMs.

In some embodiments, the ego vehicle 123 is equipped with two or more different DSRC radios (e.g., the first V2X radio 147 and the second V2X radio 148). Each of the DSRC radios includes a DSRC transmitter and a DSRC receiver. One of the DSRC radios is dedicated solely to receiving BSMs. The other DSRC radio(s) is used to receive any other non-BSM DSRC messages.

In some embodiments, the memory 127 stores mask data. The mask data includes digital data that describes the transmission mask for each of the seven DSRC channels.

In some embodiments, the warning system 199 includes code and routines that are operable, when executed by the processor 125, to cause the processor 125 to monitor each of the seven DSRC channels. The processor 125 has access to the mask data which is stored in the memory 127. For example, the mask data is stored in a buffer of one or more of the first V2X radio 147 and the second V2X radio 148 so that it is quickly retrievable by the processor 125.

In some embodiments, the warning system 199 includes code and routines that are operable, when executed by the processor 125, to cause the processor 125 to continuously analyze each of the DSRC channels when a DSRC packet is sent (e.g., every 0.10 seconds).

In some embodiments, the warning system 199 includes code and routines that are operable, when executed by the processor 125, to cause the processor 125 to execute one or more of the steps of the method 800 depicted in FIGS. 8A and 8B (or one or more steps of the method 300 depicted in FIG. 3) responsive to receipt of a V2X message on one or more of the seven DSRC channels.

A transmission event is a V2X transmission (e.g., a DSRC transmission) on a particular channel of a V2X radio (e.g., a DSRC channel of a DSRC radio or some other V2X channel of a V2X radio).

In some embodiments, the warning system 199 includes software that is operable, when executed by the processor 125, to cause the processor 125 to monitor each of the DSRC channels available to the first V2X radio 147 and the second V2X radio 148. This software has access to the mask data which is stored in the memory 127.

In some embodiments, the warning system 199 includes software that is operable, when executed by the processor 125, to cause the processor 125 to continuously analyze each of the DSRC channels at transmission events. For each transmission event and each DSRC channel, the warning system 199 includes software that is operable, when executed by the processor 125, to cause the processor 125 to execute one or more of the steps of the method 800 depicted in FIGS. 8A and 8B (or one or more steps of the method 300 depicted in FIG. 3) responsive to receipt of a V2X message on one or more of the seven DSRC channels.

In some embodiments, the BSM data 195 is a payload for a V2X message. For example, the BSM data 195 and the remote data 194 included in the BSM data 195 is a payload for the V2X message. In some embodiments, the V2X message is a BSM. In some embodiments, the BSM data 195 is the payload for a DSRC message or any other type of V2X message. In some embodiments, the BSM data 195 includes the sensor data 185 recorded by the sensors of a connected vehicle which originated the V2X message which includes the BSM data 195 as its payload.

Referring now to FIG. 1B, depicted is an is an operating environment 101 that includes a set of V2X radios 147, 148 and the warning system 199 according to some embodiments.

As depicted in FIG. 1B, V2X channel #172 is the channel is reserved for BSMs. The first V2X radio 147 is dedicated to sending and receiving BSMs using V2X channel #172. The other six V2X channels (#174, #176, #178, #180, #182 and #184) are accessible to the second V2X radio 148. As depicted in this embodiment, channel #176 is reserved for receiving PSMs.

Example Computer System

Figure 2:
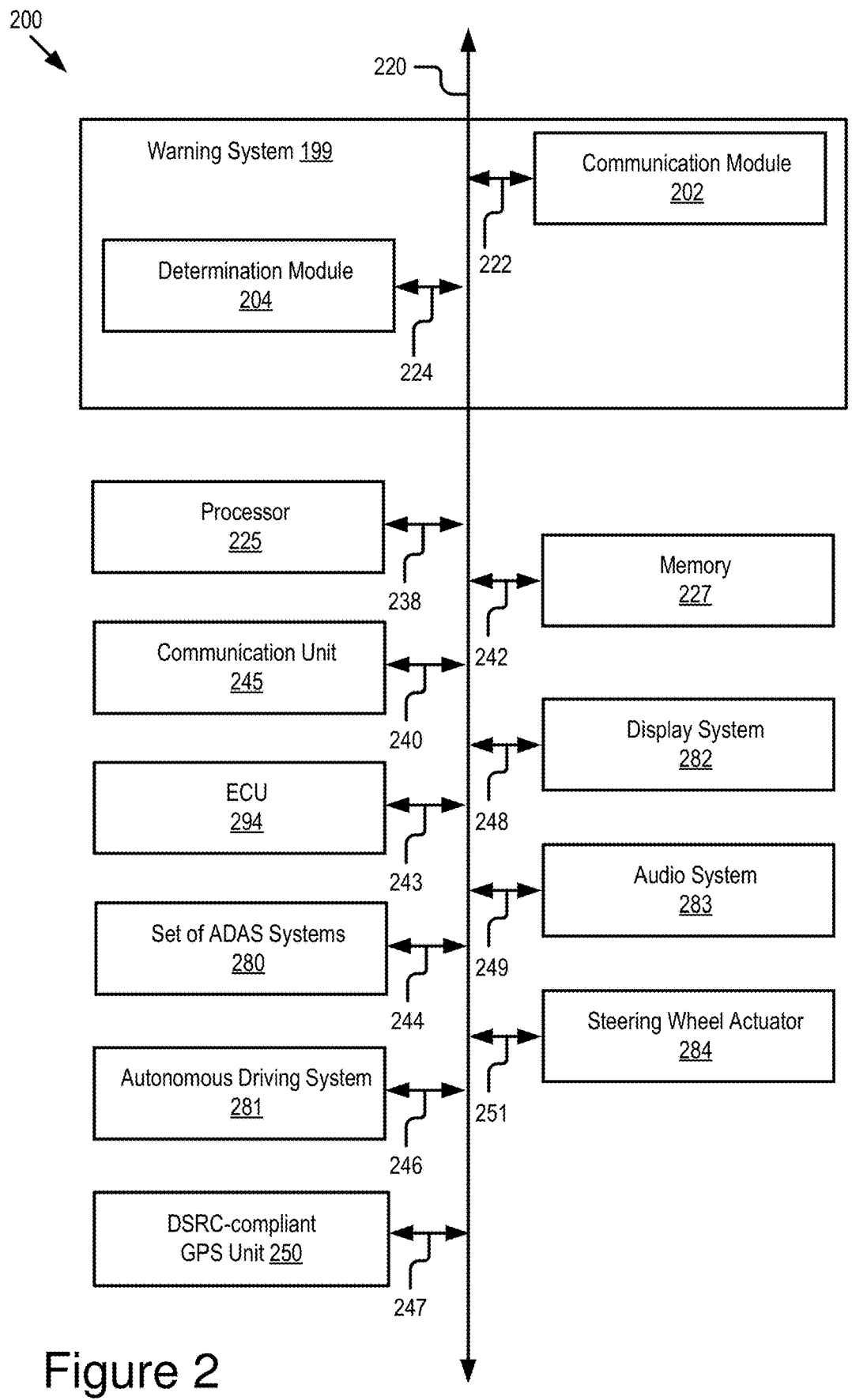
FIG. 2 is a block diagram illustrating an example computer system including the warning system according to some embodiments.

Referring now to FIG. 2, depicted is a block diagram illustrating an example computer system 200 including the warning system 199 according to some embodiments. In some embodiments, the computer system 200 may include a special-purpose computer system that is programmed to perform one or more steps of one or more of the method 300 described below with reference to FIG. 3 (one or more steps of one or more of the method 800 described below with reference to FIGS. 8A and 8B). In some embodiments, the computer system 200 is an onboard vehicle computer of the ego vehicle 123. In some embodiments, the computer system 200 is an onboard unit of the ego vehicle 123. In some embodiments, the computer system 200 is an ECU, head unit or some other processor-based computing device of the ego vehicle 123.

The computer system 200 includes one or more of the following elements according to some examples: the warning system 199; a processor 225; a communication unit 245; a memory 227; an ECU 294; a set of ADAS systems 280; an autonomous driving system 281; a DSRC-compliant GPS unit 250; the display system 282; the audio system 283; and the steering wheel actuator 284. The components of the computer system 200 are communicatively coupled by a bus 220.

In the illustrated embodiment, the processor 225 is communicatively coupled to the bus 220 via a signal line 238. The communication unit 245 is communicatively coupled to the bus 220 via a signal line 240. The memory 127 is communicatively coupled to the bus 220 via a signal line 242. The ECU 294 is communicatively coupled to the bus 220 via a signal line 243. The set of ADAS systems 280 is communicatively coupled to the bus 220 via a signal line 244. The autonomous driving system 281 is communicatively coupled to the bus 220 via a signal line 246. The DSRC-compliant GPS unit 250 is communicatively coupled to the bus 220 via a signal line 244. The display system 282 is communicatively coupled to the bus 220 via a signal line 248. The audio system 283 is communicatively coupled to the bus 220 via a signal line 249. The steering wheel actuator 284 is communicatively coupled to the bus 220 via a signal line 251.

The processor 225 provides similar functionality as the processor 125 described above with reference to FIG. 1A, and so, that description will not be repeated here. The communication unit 245 provides similar functionality as the communication unit 245 described above with reference to FIG. 1A, and so, that description will not be repeated here. The memory 227 provides similar functionality as the memory 127 described above with reference to FIG. 1A, and so, that description will not be repeated here. The ECU 294 provides similar functionality as the ECU 193 described above with reference to FIG. 1A, and so, that description will not be repeated here. The set of ADAS systems 280 provides similar functionality as the set of ADAS systems 180 described above with reference to FIG. 1A, and so, that description will not be repeated here. The autonomous driving system 281 provides similar functionality as the autonomous driving system 181 described above with reference to FIG. 1A, and so, that description will not be repeated here. The display system 282 provides similar functionality as the display system 182 described above with reference to FIG. 1A, and so, that description will not be repeated here. The audio system 283 provides similar functionality as the audio system 183 described above with reference to FIG. 1A, and so, that description will not be repeated here.

The memory 227 may store any of the data described above with reference to FIGS. 1A and 1B or below with reference to FIGS. 2-8B. The memory 227 may store any digital data needed for the computer system 200 to provide its functionality.

In some embodiments, the DSRC-compliant GPS unit 250 includes any hardware and software necessary to make the ego vehicle 123, computer system 200, or the DSRC-compliant GPS unit 250 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the DSRC-compliant GPS unit 250 is operable to provide GPS data describing the location of the ego vehicle 123 with lane-level accuracy. For example, the ego vehicle 123 is traveling in a lane of a roadway. Lane-level accuracy means that the location of the ego vehicle 123 is described by the GPS data so accurately that the lane of travel of the ego vehicle 123 within the roadway may be accurately determined based on the GPS data for this ego vehicle 123 as provided by the DSRC-compliant GPS unit 250. In some embodiments, the GPS data is an element of the BSM data 195 (see, e.g., FIGS. 4 and 5).

In some embodiments, the DSRC-compliant GPS unit 250 includes hardware that wirelessly communicates with a GPS satellite to retrieve GPS data that describes the geographic location of the ego vehicle 123 with a precision that is compliant with the DSRC standard. The DSRC standard requires that GPS data be precise enough to infer if two vehicles (one of which is, for example, the ego vehicle 123) are located in adjacent lanes of travel. In some embodiments, the DSRC-compliant GPS unit 250 is operable to identify, monitor and track its two-dimensional position within 1.5 meters of its actual position 68% of the time under an open sky. Since driving lanes are typically no less than 3 meters wide, whenever the two-dimensional error of the GPS data is less than 1.5 meters the warning system 199 described herein may analyze the GPS data provided by the DSRC-compliant GPS unit 250 and determine what lane the ego vehicle 123 is traveling in based on the relative positions of two or more different vehicles (one of which is, for example, the ego vehicle 123) traveling on the roadway at the same time.

By comparison to the DSRC-compliant GPS unit 250, a conventional GPS unit which is not compliant with the DSRC standard is unable to determine the location of an ego vehicle 123 with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to identify a lane of travel for an ego vehicle 123 based on GPS data alone; instead, systems having only conventional GPS units must utilize sensors such as cameras to identify the lane of travel of the ego vehicle 123. Identifying a lane of travel of a vehicle is beneficial, for example, because in some embodiments it may enable the warning system 199 to more accurately identify a location of an ego vehicle 123 including the computer system 200 and traveling in a roadway having multiple lanes of travel.

The steering wheel actuator 284 includes an actuator that is installed in a steering wheel of a vehicle (e.g., the ego vehicle 123) and is operable to cause the steering wheel to vibrate or provide a counter-steering force on the steering wheel.

In some embodiments, one or more of the following elements are examples of a vehicle component: the display system 282; the audio system 283; the steering wheel actuator 284; an ADAS system included in the set of ADAS systems 280; and the autonomous driving system 281.

In the illustrated embodiment shown in FIG. 2, the warning system 199 includes: a communication module 202; and a determination module 204.

The communication module 202 can be software including routines for handling communications between the warning system 199 and other components of the operating environments 100 and 101 of FIGS. 1A and 1B, respectively.

In some embodiments, the communication module 202 can be a set of instructions executable by the processor 225 to provide the functionality described below for handling communications between the warning system 199 and other components of the computer system 200. In some embodiments, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the operating environment 100. For example, the communication module 202 receives or transmits, via the communication unit 245, some or all of the digital data stored on the memory 127. The communication module 202 may send or receive any of the digital data or messages described above with reference to FIGS. 1A and 1B or below with reference to FIGS. 2-8B, via the communication unit 245.

In some embodiments, the communication module 202 receives data from components of the warning system 199 and stores the data in the memory 227 (or a buffer or cache of the memory 227, or a standalone buffer or cache which is not depicted in FIG. 2). For example, the communication module 202 receives the BSM data 195 from the communication unit 245 and stores the BSM data 195 in the memory 227.

In some embodiments, the communication module 202 may handle communications between components of the warning system 199. For example, the communication module 202 transmits the BSM data 195 from the memory 227 to the determination module 204.

In some embodiments, the determination module 204 can be a set of instructions executable by the processor 225 which are operable, when executed by the processor 225, to cause the processor 225 to execute one or more steps of the method 300 described below with reference to FIG. 3 (or one or more steps of the method 800 described below with reference to FIGS. 8A and 8B). In some embodiments, the determination module 204 can be stored in the memory 227 of the computer system 200 and can be accessible and executable by the processor 225. The determination module 204 may be adapted for cooperation and communication with the processor 225 and other components of the computer system 200 via signal line 224.

Referring now to FIG. 3, depicted a method 300 for to modifying a vehicle component of an ego vehicle based on a payload of a V2X communication so that the ego vehicle does not collide with a remote vehicle according to some embodiments. The steps of the method 300 are executable in any order, and not necessarily the order depicted in FIG. 3. The steps of the method 300 are now described according to some embodiments.

At step 301, Determine whether the ego vehicle is estimated to change lanes to a particular lane [i.e., "lane X"] in the future (e.g., at a target time).

At step 303, determine whether the remote vehicle is estimated to change lanes to lane X in the future.

At step 305, determine ego time information describing a time when the ego vehicle is likely to arrive at lane X.

At step 307, determine remote time information describing a time when the remote vehicle is likely to arrive at lane X.

At step 308, determine whether the ego vehicle is likely to collide with the remote vehicle when it arrives at lane X because both the ego vehicle and the remote vehicle are changing lanes to lane X at approximately the same time.

At step 309, if a collision is determined to be likely to occur at step 308, then proactively provide a warning to the ego driver of the ego vehicle before the ego driver attempts to change lanes to lane X so that the ego driver can decide not to change lanes to lane X and thereby avoid the collision with the remote vehicle.

Referring now to FIG. 4, depicted is a block diagram illustrating an example of the BSM data 195 according to some embodiments. The BSM data 195 includes the sensor data 185.

The regular interval for transmitting BSMs may be user configurable. In some embodiments, a default setting for this interval may be transmitting the BSM every 0.10 seconds or substantially every 0.10 seconds.

A BSM is broadcasted over the 5.9 GHz DSRC band. DSRC range may be substantially 1,000 meters. In some embodiments, DSRC range may include a range of substantially 100 meters to substantially 1,000 meters. DSRC range is generally 300 to 500 meters depending on variables such as topography and occlusions between DSRC-equipped endpoints.

Referring now to FIG. 5, depicted is a block diagram illustrating an example of BSM data 195 according to some embodiments.

A BSM may include two parts. These two parts may include different BSM data 195 as shown in FIG. 5.

Part 1 of the BSM data 195 may describe one or more of the following: the GPS data of the vehicle; vehicle heading; vehicle speed; vehicle acceleration; vehicle steering wheel angle; and vehicle size.

Part 2 of the BSM data 195 may include a variable set of data elements drawn from a list of optional elements. Some of the BSM data 195 included in Part 2 of the BSM are selected based on event triggers, e.g., anti-locking brake system ("ABS") being activated may trigger BSM data 195 relevant to the ABS system of the vehicle.

In some embodiments, some of the elements of Part 2 are transmitted less frequently in order to conserve bandwidth.

In some embodiments, the BSM data 195 included in a BSM includes current snapshots of a vehicle (e.g., an ego vehicle or a remote vehicle).

Figure 6:
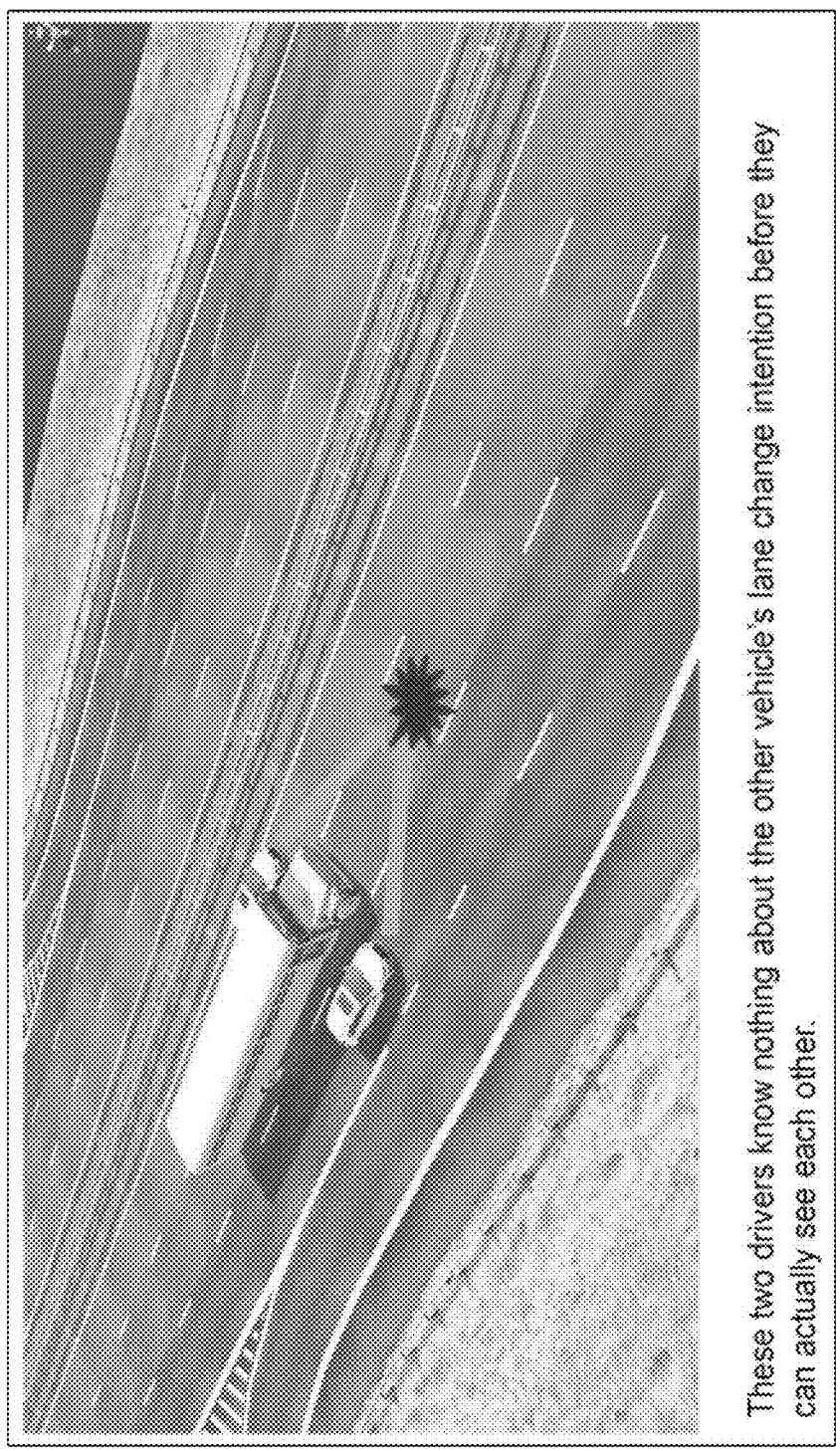
FIG. 6 is a block diagram illustrating a first use case for the warning system according to some embodiments.

Referring now to FIG. 6, depicted is a block diagram illustrating a first use case 600 for the warning system according to some embodiments.

In some embodiments, the first use case 600 includes a lane change event where two vehicles are attempting to change lanes to the same target lane but cannot see one another for some reason. For example, in FIG. 6 the vehicles (or their drivers) cannot see one another because they are separated by a bus that occludes them from one another.

Drivers of ego vehicles frequently change lanes to target lanes in situations where they cannot view other remote vehicles that want to change lanes to the same target lane. For example, an ego vehicle and a remote vehicle each want to change lanes to a target lane ("lane X") and the ego vehicle and the remote vehicle are occluded from one another. FIG. 6 depicts an embodiment of this example because the vehicles each want to change lanes to the same target lane and their presence is unknown to one another because the school bus occludes their presence from being viewable to one another. As a result, these vehicles may collide with one another if they each change lanes to the same lane as the school bus (e.g., the target lane) at the same time (e.g., the target time):

Collisions are likely in these situations because (1) the drivers of the ego vehicle and the remote vehicle cannot see that other vehicles are trying to changes lanes to the same target lane, and so, they cannot respond with driving decisions that avoid a collision; and (2) the ADAS systems or autonomous driving systems of these vehicles will not be able detect the potential collision because neither vehicle's onboard sensors will be able to measure the presence/movement of the other vehicle that is trying to change lanes to the same target lane, and so, the ADAS systems will not be able to respond with an output that decreases the likelihood of a collision. As a result, a collision is more likely to occur in these situations.

Figure 7:
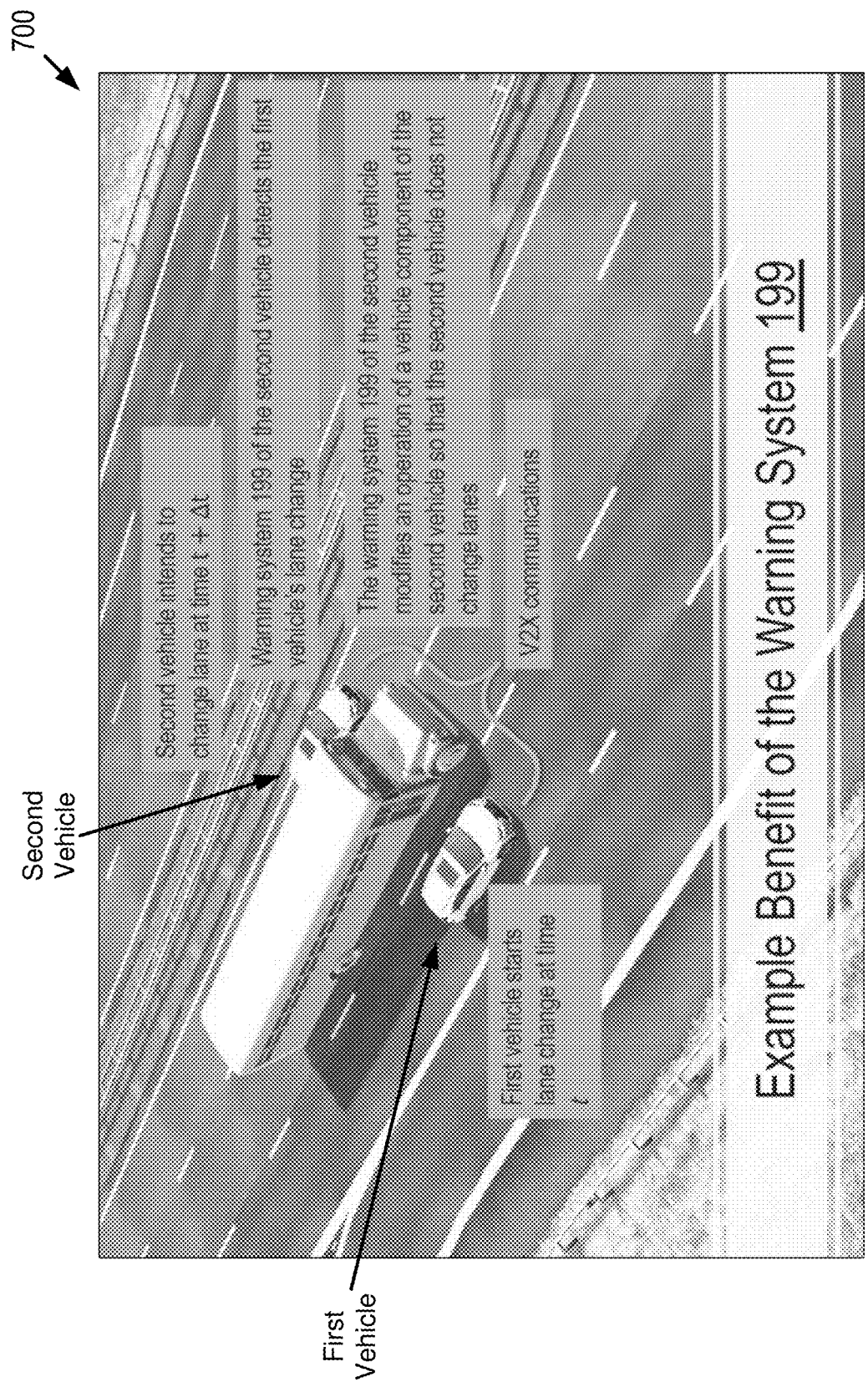
FIG. 7 is a block diagram illustrating an example benefit of the warning system according to some embodiments.

Referring now to FIG. 7, depicted is a block diagram illustrating an example benefit 700 of the warning system according to some embodiments. The equations and use cases depicted in FIG. 7 are illustrative and not intended to be limiting. Other equations and use cases are possible.

Referring now to FIGS. 8A and 8B, depicted is a method 800 for to modifying a vehicle component of an ego vehicle based on a payload of a V2X communication (e.g., BSM data and/or the remote data included in the BSM data) so that the ego vehicle does not collide with a remote vehicle according to some embodiments.

At step 802, collect sensor measurements. The sensor measurements describe information about the remote vehicle. For example, the sensor measurements describe the information that is depicted in FIG. 4 or 5. The sensor measurements are included in the payload for the V2X message. The remote data is generated based on these sensor measurements. The remote data is digital data that describes sensor measurements which indicate a lane change intent of the remote vehicle. A lane change intent indicates both a target lane and a target time for a lane change event executed by the remote vehicle.

At step 804, transmit the V2X message. The payload for this V2X message includes the remote data. This V2X message may be broadcast. This V2X message may be received by an RSU and then relayed by the RSU.

At step 806, a V2X radio of the ego vehicle receives the V2X message.

At step 808, the remote data is parsed from the payload of the V2X message.

At step 810, the remote data is stored in a non-transitory memory.

At step 812, collect sensor measurements. The sensor measurements describe information about the ego vehicle. The ego data is generated based on these sensor measurements. The ego data is digital data that describes sensor measurements which indicate a lane change intent of the ego vehicle. A lane change intent indicates both a target lane and a target time for a lane change event executed by the ego vehicle. An example of a lane change event is depicted in FIGS. 6 and 7.

At step 814, ego data is generated. The ego data is generated based on the sensor measurements recorded at step 812.

At step 816, the ego data and the remote data is provided as an input to the warning system. The warning system provides the analysis depicted in steps 818-826 based on these inputs. The output of this analysis is the analysis data.

Accordingly, the warning system receives the ego data and the remote data as inputs and outputs the analysis data.

Referring now to FIG. 8B, at step 818 a determination is made regarding whether the ego vehicle is estimated to change lanes to a target lane. This determination is made based on the information described by the ego data.

At step 820, a determination is made regarding whether the remote vehicle is estimated to change lanes to the target lane. This determination is made based on the information described by the remote data.

At step 822, a first time when the ego vehicle is likely to arrive at the target lane is determined. This first time is a "target time." The target time is described by the ego time information.

At step 824, a second time when the remote vehicle is likely to arrive at the target lane is determined. The second time may be the same or substantially the same as the target time.

At step 826, a determination is made regarding whether the ego vehicle and the remote vehicle will arrive at the target lane at the same time or substantially the same time. If so, then the determination indicates that a collision is likely to occur.

At step 828, if a collision is indicated as likely to occur at step 826, then the warning system proactively generates warning data that is provided to a vehicle component of the ego vehicle. The vehicle component is then executed using this warning data as an input. The warning data is operable to modify an operation of the vehicle component. For example, if the vehicle component is a display system or audio system, then the vehicle component provides a warning responsive to being executed using the warning data as an input. If the vehicle components are an ADAS system or autonomous driving system, then the vehicle component modifies the steering of the ego vehicle so that it does not steer into the target lane at the target time responsive to being executed using the warning data as an input. If the vehicle component is a steering wheel actuator, then the vehicle component causes the steering wheel to vibrate or provide a counter steering force responsive to being executed using the warning data as an input.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method executed by an ego vehicle that includes an autonomous driving system, the method comprising:
   determining, based on remote data that describes sensor measurements for a remote vehicle that are described in a Vehicle-to-Everything (V2X) message originated by the remote vehicle, that the remote vehicle is changing lanes to a target lane at a target time, wherein the remote data includes one or more of a turning direction for a turn signal of the remote vehicle when the turn signal is engaged and a change in a steering wheel angle of the remote vehicle over time;
   determining that the ego vehicle is changing lanes to the target lane at the target time;
   estimating that the ego vehicle and the remote vehicle will collide at the target lane at the target time; and
   modifying, with the autonomous driving system, a steering wheel of the ego vehicle so that the ego vehicle does not steer into the target lane at the target time wherein this modifying is based on the determination that the ego vehicle is changing lanes to the target lane at the target time.

2. The method of claim 1, further comprising:
   generating warning data based on estimating that the ego vehicle and the remote vehicle will collide; and
   inputting the warning data to the autonomous driving system;
   wherein modifying the steering wheel is responsive to the warning data being input to the autonomous driving system and based on the determination that the ego vehicle is changing lanes to the target lane at the target time and the estimation that the ego vehicle and the remote vehicle will collide at the target lane at the target time.

3. The method of claim 2, wherein the warning data includes digital data that is operable, when inputted to an actuator of the autonomous driving system, to cause the actuator to provide a counter-steering force on the steering wheel.

4. The method of claim 1, wherein the V2X message is received by a V2X radio.

5. The method of claim 1, wherein the remote data further includes a location of the remote vehicle that is accurate to within 1.5 meters.

6. The method of claim 4, wherein the V2X radio includes a plurality of channels including a first reserved channel that is reserved for receiving the V2X message.

7. The method of claim 6, wherein the first reserved channel is reserved for a Basic Safety Message and a second reserved channel is reserved for receiving a Pedestrian Safety Message.

8. The method of claim 1, wherein the V2X message is a basic safety message and the sensor measurements include a speed, a heading, and the steering wheel angle of the remote vehicle.

9. A system included in an ego vehicle, the system comprising:
   a processor communicatively coupled to an autonomous driving system, a Vehicle-to-Everything (V2X) radio, and a non-transitory memory, wherein the V2X radio is operable to receive a V2X message and the non-transitory memory stores computer code that is operable, when executed by the processor, to cause the processor to:
   determine, based on remote data that describes sensor measurements for a remote vehicle that are described in a Vehicle-to-Everything (V2X) message originated by the remote vehicle, that the remote vehicle is changing lanes to a target lane at a target time, wherein the remote data includes one or more of a turning direction for a turn signal of the remote vehicle when the turn signal is engaged or a change in a steering wheel angle of the remote vehicle over time;
   determine that the ego vehicle is changing lanes to the target lane at the target time;
   estimate that the ego vehicle and the remote vehicle will collide at the target lane at the target time; and modify, with the autonomous driving system, a steering wheel of the ego vehicle so that the ego vehicle does not change lanes to the target lane at the target time wherein this modification is based on the determination that the ego vehicle is changing lanes to the target lane at the target time and the estimation that the ego vehicle and the remote vehicle will collide at the target lane at the target time.

10. The system of claim 9, wherein the computer code is further operable to cause an audio system to generate an auditory warning.

11. The system of claim 9, wherein the computer code is further operable to cause the processor to:
generating warning data based on estimating that the ego vehicle and the remote vehicle will collide; and
inputting the warning data to the autonomous driving system;
wherein modifying the steering wheel is responsive to the warning data being input to the autonomous driving system and based on the determination that the ego vehicle is changing lanes to the target lane at approximately the target time and the estimation that the ego vehicle and the remote vehicle will collide at the target lane at the target time.

12. The system of claim 9, wherein the V2X message is received by a V2X radio.

13. The system of claim 11, wherein the warning data includes digital data that is operable, when inputted to an actuator of the autonomous driving system, to cause the actuator to provide a counter-steering force on the steering wheel.

14. The system of claim 12, wherein the V2X radio includes a plurality of channels including a first reserved channel that is reserved for receiving the V2X message.

15. The system of claim 14, wherein the first reserved channel is reserved for a Basic Safety Message and a second reserved channel is reserved for receiving a Pedestrian Safety Message.

16. The system of claim 9, wherein the V2X message is a basic safety message and the sensor measurements include a speed, a heading, and the steering wheel angle of the remote vehicle.

17. A computer program product comprising instructions that, when executed by a processor of an ego vehicle including an autonomous driving system, causes the processor to perform operations comprising:
determining, based on remote data that describes sensor measurements for a remote vehicle that are described in a Vehicle-to-Everything (V2X) message originated by the remote vehicle, that the remote vehicle is changing lanes to a target lane at a target time, wherein the remote data includes one or more of a turning direction for a turn signal of the remote vehicle when the turn signal is engaged or a change in a steering wheel angle of the remote vehicle over time;
determining that the ego vehicle is changing lanes to the target lane at the target time;
estimating that the ego vehicle and the remote vehicle will collide at the target lane at the target time; and
modifying, with the autonomous driving system, a steering wheel of the ego vehicle so that the ego vehicle does not change lanes to the target lane at the target time wherein the modifying is based on the determination that the ego vehicle is changing lanes to the target lane at the target time and the estimating that the ego vehicle and the remote vehicle will collide at the target lane at the target time.

18. The computer program product of claim 17, wherein the operations further comprise:
generating warning data based on estimating that the ego vehicle and the remote vehicle will collide; and
inputting the warning data to the autonomous driving system;
wherein modifying the steering wheel is responsive to the warning data being input to the autonomous driving system and based on the determination that the ego vehicle is changing lanes to the target lane at the target time and the estimation that the ego vehicle and the remote vehicle will collide at the target lane at the target time.

19. The computer program product of claim 17, wherein the operations further comprise providing a warning to a driver of the ego vehicle.

20. The computer program product of claim 19, wherein the warning is selected from a group that consists of: generating a warning message that is displayed on a display device of the ego vehicle; and generating a warning sound that is played over a speaker of the ego vehicle.

* * * * *